(12) United States Patent
Upadhyaya et al.

(10) Patent No.: US 8,707,310 B2
(45) Date of Patent: Apr. 22, 2014

(54) BATCH PROCESSING OF JOBS ON MULTIPROCESSORS BASED ON ESTIMATED JOB PROCESSING TIME

(75) Inventors: Suvro Upadhyaya, Dublin (IE); Hideto Mizuno, Kanagawa (JP)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 12/677,291

(22) PCT Filed: Oct. 15, 2008

(86) PCT No.: PCT/US2008/080022
§ 371 (c)(1),
(2), (4) Date: Nov. 10, 2011

(87) PCT Pub. No.: WO2010/044790
PCT Pub. Date: Apr. 22, 2010

(65) Prior Publication Data
US 2012/0150528 A1 Jun. 14, 2012

(51) Int. Cl.
*G06F 9/46* (2006.01)
(52) U.S. Cl.
USPC .......................................................... 718/101
(58) Field of Classification Search
USPC ........................................................ 718/101
See application file for complete search history.

(56) References Cited

U.S. PATENT DOCUMENTS

| 6,223,205 | B1 * | 4/2001 | Harchol-Balter et al. ..... 718/105 |
| 6,353,844 | B1 | 3/2002 | Bitar et al. |
| 2003/0200252 | A1 * | 10/2003 | Krum ............................. 709/102 |
| 2005/0198636 | A1 | 9/2005 | Barsness et al. |
| 2005/0283783 | A1 * | 12/2005 | DeSota ......................... 718/100 |
| 2006/0001898 | A1 * | 1/2006 | Maeshima et al. ........... 358/1.14 |
| 2007/0047528 | A1 * | 3/2007 | Croak et al. .................. 370/356 |
| 2007/0220516 | A1 | 9/2007 | Ishguro et al. |
| 2007/0233456 | A1 * | 10/2007 | Kim ................................. 704/2 |

FOREIGN PATENT DOCUMENTS

| CN | 1729442 A | 1/2006 |
| CN | 101004743 A | 7/2007 |
| JP | 2008-107875 A | 5/2008 |

OTHER PUBLICATIONS

International Search Report from PCT/US2008/080022, dated Jun. 29, 2009.
Office Action for corresponding Chinese Application No. 200880111601.2 dated Sep. 15, 2011, 13 pages.

* cited by examiner

*Primary Examiner* — Meng An
*Assistant Examiner* — James J Lee
(74) *Attorney, Agent, or Firm* — Kilpatrick Townsend and Stockton LLP

(57) ABSTRACT

A system for processing a batch of jobs is provided. The system comprises a plurality of processing elements that are characterized in that each processing element is configured to sequentially process jobs with an estimated process time within a respective allotted range of values. The jobs may comprise packets of data within a data processing system. The system is particularly useful for processing data corresponding to translated text in a text translation system.

7 Claims, 7 Drawing Sheets

BATCH PROCESSING OF JOBS ON MULTIPROCESSORS BASED ON ESTIMATED JOB PROCESSING TIME

CROSS-REFERENCES TO RELATED APPLICATIONS

This application claims priority to PCT/US2008/080022, filed Oct. 15, 2008. The disclosure of PCT/US2008/080022 is hereby incorporated by reference in its entirety for all purposes.

BACKGROUND OF THE INVENTION

1. Field of the Invention

The present invention is in the field of data processing. In particular, the present invention provides a system and a method for processing a batch of data comprising a plurality of quanta of data. Such a system and method may be used as part of a text translation system.

2. Description of the Related Art

In the field of data processing, many batch processing systems are implemented using a queue structure. Typically, jobs or data to be processed is received by an entity and added to the queue structure to await processing. In a simple batch processing system a processing element would sequentially select a job or data from the queue structure for processing.

In batch processing systems with a large variety of jobs, it was found that a single processing element would generate a "bottleneck" within the batch processing system, wherein certain jobs would monopolise the processing resources of the system. In particular, the processing of large pieces of data would often slow down the system in a detrimental manner.

In the art, a compromise solution to this problem is to split the single processing element into multiple processing elements to create a parallel processing system. When implemented using a set amount of hardware or processing resources, for example a set number of central processing elements, a parallel processing system enables the distribution of the processing resources across the processing elements. In such a system, as each processing element now uses a proportion of the processing resources that were available to the single processing element, each of the plurality of processing elements typically takes a longer period of time than the single processing element to complete a given processing job. This detrimental effect is offset by the hope that jobs that monopolise processing power will only detrimentally affect one of the processing elements within the batch.

However, when implementing such a parallel processing system it has been found that such a system does not process data efficiently when there are a large number of jobs to be processed and/or where the resources required for each job vary widely between the received jobs. For example, such a system typically performs poorly when processing a large quantity of data files of a variety of sizes. Furthermore, even though such parallel processing systems may objectively reduce total processing time for a given number of jobs, these may not translate into a perceived (i.e. subjective) increase in processing efficiency, for example waiting time for processing may be high, even if total throughput is also high.

Hence, there is a requirement in the art for an improved system for processing jobs or data that can efficiently process a large number of jobs of different qualities.

BRIEF SUMMARY OF THE INVENTION

In accordance with a first aspect of the present invention there is provided a system for processing a batch of jobs, the system comprising: a plurality of processing elements wherein each processing element is configured to sequentially process jobs with an estimated process time within a respective allotted range of values.

By using this system, two or more processing elements can efficiently parallel process a batch of jobs or data. To increase perceived efficiency a first processing element may typically be assigned large jobs, for example those comprising a large quantity of data that require a long period of time for processing, and a second processing element may be assigned smaller jobs. Without such a system a large job would hold up the system meaning that small jobs, for example those with a small quantity of data to be processed, would experience a long time delay before processing. However, by using a processing element, such as one that is adapted to sequentially process quanta of data within a batch of jobs or data having a quantity of data below a predetermined value, a number of quanta of data having a small quantity of data may be quickly processed in parallel with the processing of a large quantity of data by the first processing element, increasing both the actual and perceived processing rates for the batch of data. If the first processing element and the second processing element are both using common resources the system of the present invention provides a way to balance these resources efficiently.

In certain embodiments, the allotted range of values for each processing element may be configurable, for example may be variables in an XML file that can be set by a user. The range of values may be implemented as a range of positive values below a preset threshold, wherein the threshold may be stored as a variable in an XML file.

Preferably, the system of the present invention also comprises a job or data manager adapted to set the status of a job or quanta of data in the batch, wherein the status comprises one of "waiting" and "processing". Each processing element may then be assigned, preferably by the job manager, to a "waiting" job or quantum of data that matches its associated criteria from a batch and to set the status of said quantum to "processing". The job or data manager may also be further adapted to remove a processed job or quantum of data from the batch after processing. In particular embodiments, the job or data manager is adapted to receive a quantum of data from a client device, such as a translation computer system or an FTP server and may comprise scripts in an appropriate programming language. In these cases the data manager may also be further adapted to add said quantum of data to the batch on receipt of the quantum of data and set the status of said quantum to "waiting".

Preferably, the system further comprises a queue structure adapted to catalogue the jobs or quanta of data within the batch for subsequent processing. Each processing element in this case is assigned a job from the queue structure, wherein the queue structure may be implemented as a database wherein jobs are sorted according to an allotted priority. In other embodiments the processing elements may be assigned jobs from a general pool of jobs based on their priority. In cases where two jobs have the same priority, the order in which a job is selected may be based on a timestamp, the timestamp indicating a time at which the job was added to the queue structure.

In certain embodiments each processing element comprises a PERL script, wherein the predetermined value for each appropriate processing element is set using an XML control script.

A preferred application of the present invention relates to handling translated portions of text associated with a software application. Thus, in a preferred embodiment of the present invention, each quanta of data comprises one or more segments of text that have been translated from a first language to a second language. In this case the processing procedure performed by each processing element may comprise updating a translation database with the one or more translated segments of text, the one or more translated segments of text corresponding to segments of an original document in a first language. By using a translation database re-use is increased and the amount of data that needs to be distributed and received from translators is reduced.

Hence, the system of the present invention may be used to implement a translation system wherein segments of text to be translated are distributed to translators in different regions of the world, possibly using a file transfer protocol system. The batch processing system of the present invention is then able to process translated segments of text as they are received from said translators in an efficient manner, increasing the speed of the translation process. Depending on the embodiment the batch processing system of the present invention may be used for processing before translation or processing after translation. In certain embodiments the processing procedure comprises validation routines that comprise resegmenting the original document and retrieving matching translated segments from a translation database corresponding to the resegmented components for the original document. Such checks are required in order to confirm the accuracy of translations.

According to a second aspect of the present invention there is provided a method of processing a batch of jobs, the method comprising: selecting a job from the batch; determining an estimate of processing time for the selected job; assigning the job to a processing element from a plurality of processing elements dependent upon whether said estimate of processing time falls within a range of values allotted to the processing element, and processing said job using the assigned processing element.

Such a method provides similar advantages to the first aspect of the present invention and allows jobs or quanta of data from a batch to be selected for processing by a plurality of processing elements based on the estimated processing time required for each job. In certain embodiments the processing time may be estimated based on the quantity of data that comprises a quantum of data or job. In certain embodiments of both aspects the quanta of data may comprise data files wherein the selection of a file for processing by a processing element is performed based on the file size. In other embodiments, the quanta of data may comprise blocks of text data such as a particular number of bytes.

In certain embodiments of the second aspect the method further comprises comparing the estimate of processing time to the allotted range of values for one or more processing elements; and if the estimate does not fall within the allotted range of values for the one or more processing elements, assigning the job to a processing element adapted to sequentially process any job within the batch.

The method may also comprise receiving one or more jobs and adding said jobs to the batch.

In other alternative or complementary embodiments, the method may also comprise, on receipt of a job or quantum of data, setting the status of said job or said quantum of data in a batch to one of "waiting" or "processing"; wherein any job or quantum of data with a status of "waiting" are selected from the batch. The method may also comprise, on selection of a job or quantum of data for processing by a processing element, setting the status of said job or quantum of data to "processing" and on completion of processing a job or quantum of data removing said processed job or quantum of data from the batch. In particular embodiments, the job or quantum of data comprise files or components of files that are downloaded using from a file transfer protocol (FTP) server.

Preferably, the step of receiving a job comprises adding the job to a queue structure adapted to catalogue the jobs within a batch before subsequent processing, wherein each processing element selects a job from the queue structure. In this context, cataloguing may comprise recording attribute information in a database corresponding to the job and then ordering the jobs, and/or data records associated with the jobs, within a data structure based on one or more of the attributes. Such a queue structure may be implemented as a database and within the database each job may be assigned an associated priority in order to sort the data before it is selected by an appropriate processing element. Typically, a processing element will select a job in the queue structure with the highest priority. If two jobs have the same priority, then typically a quantum of data with an earlier time stamp is selected.

A preferred application of the method of the second aspect of the invention relates to the processing of translated text segments. Thus in a preferred embodiment, each job or quantum of data may comprise one or more segments of text that have been translated from a first language to a second language. In such cases, the processing procedure may comprise updating a translation database with the one or more translated segments of text. The translation database allows reuse of translated text segments and thus increases the efficiency of a translation system. Preferably, the one or more translated segments of text correspond to segments of an original document in a first language and the processing procedure further comprises resegmenting the original document and retrieving matching translated segments from the translation database corresponding to the resegmented components of the original document. Thus the processing performed by the processing elements comprises validating translations that are received from one or more translators.

In accordance with a third aspect of the present invention there is provided a computer-readable storage medium for storing instructions which when executed by a computer cause the computer to perform any of the methods for batch processing jobs or data as described above.

BRIEF DESCRIPTION OF THE DRAWINGS

Embodiments of the present invention will now be described by way of example with reference to the accompanying drawings, in which.

DETAILED DESCRIPTION OF THE INVENTION

Figure 7:
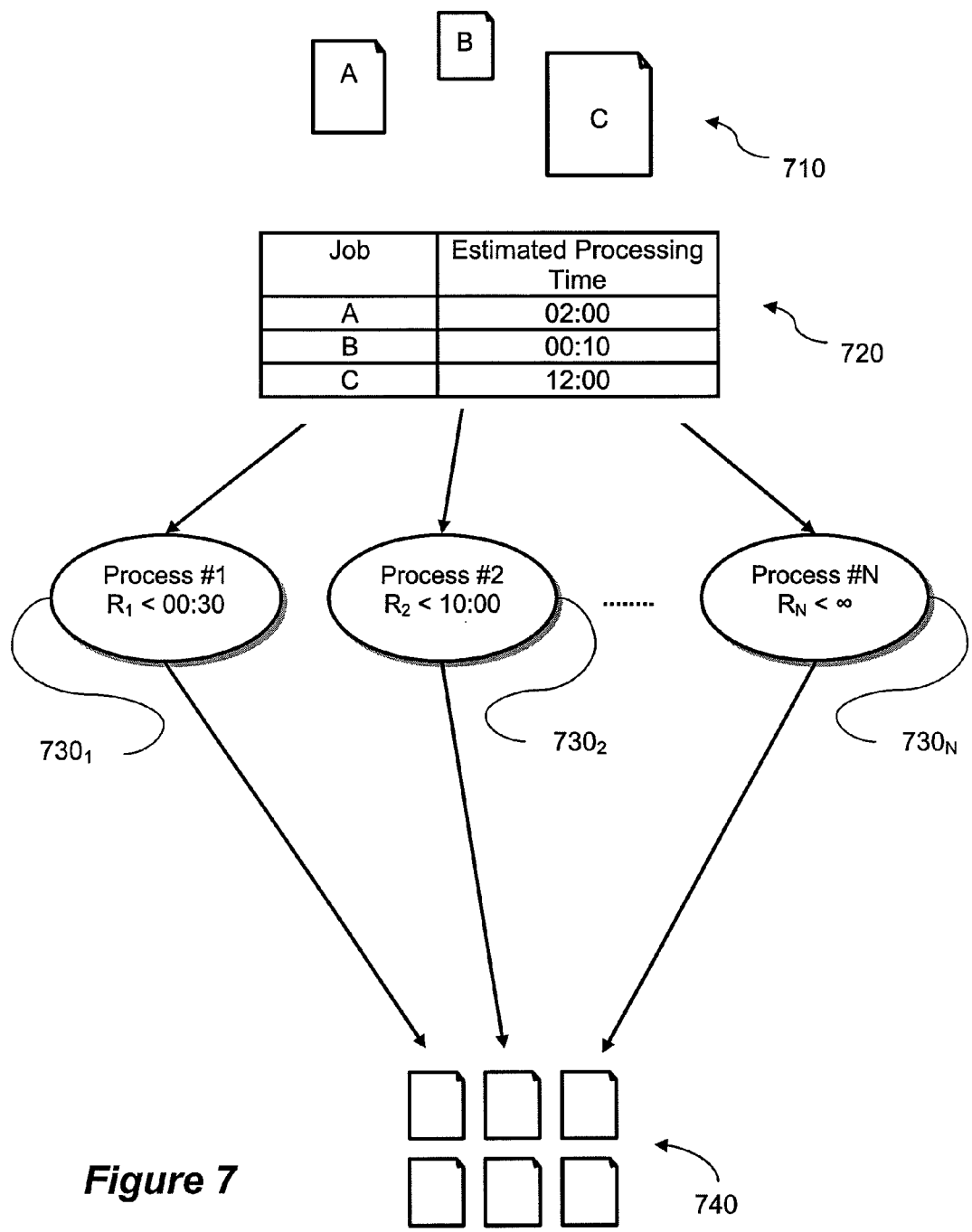
FIG. 7 illustrates schematically a batch processing system according to a first embodiment of the present invention.

FIG. 7 illustrates schematically a first embodiment of the present invention. The system of FIG. 7 comprises a plurality of processing elements 730. The processing elements 730 are adapted to process jobs within a batch of jobs waiting to be processed, 710. A "job" may comprise data to be processed directly by a hardware element, such as a central processing unit (CPU), or processed indirectly by methods executed on a hardware element. For example, each processing element may comprises a "thread" of a processing application, i.e. an implementation of the application adapted to be run simultaneously with other implementations, wherein CPU cycles of a hardware device such as a server computer are assigned to each processing element or thread.

In the present case, the batch of waiting jobs 710 comprises a plurality of jobs A, B, C, wherein each job requires a different amount of time for processing. The processing time required may be known before processing or may be estimated based on characteristics of the job. For example, in certain configurations, each job may comprise a quantum of data to be processed, wherein the estimated processing time is dependent upon the quantity of data within the quantum. In other variations, the estimated processing time may be dependent on the difficulty of the job or other factors such as the location of data to be processed, the time required to retrieve or store data, or the complexity of calculations involved.

In the example shown in FIG. 7 it will be assumed that the processing time is dependent upon the size of the job. FIG. 7 shows a queue structure 720 that lists the three jobs, A, B, C in the order that they were added to the batch. The queue structure 720 need not be implemented in a table form as shown in FIG. 7 and in certain variations, the information contained in the queue structure 720 may be obtained by inspection of the batch of jobs 710, for example by algorithms that sequentially inspect data files stored upon a storage device. In the queue structure 720 of the present example, we see that job A has an estimated processing time of 2 hours; job B has an estimated processing time 10 minutes and job C has an estimated processing time of 12 hours. As jobs are added to the batch, they may be added to the queue structure 720 in a number of different ways, for example queue structure 720 may be a first in, first out (FIFO) structure or a last in, first out (LIFO) structure.

Each processing element 730 is adapted to process a job with an estimated processing time within an allotted range of values. In this example processing element 1 ($730_1$) is adapted to process all jobs with an estimated processing time less than 30 minutes (i.e. $R_1<00:30$); processing element 2 ($730_2$) is adapted to process all jobs with an estimated processing time of less than 10 hours ($R_2<10:00$); and processing element N ($730_N$) is adapted to process all jobs with an estimated processing time of between zero seconds and infinity (i.e. $R_N<\infty$.

In use, a free processing element, i.e. a processing element that is not currently processing a job, will select a waiting job from the batch of jobs 720 and compare the estimated processing time with the range of processing time values (R). This may be achieved by comparing configuration values for each processing element, stored in a configuration file, with data within the queue structure 720. For example, in the case of FIG. 7, if all processing elements 730 are free, processing element 1 ($730_1$) will select the next job awaiting processing, A, and compare the estimated processing time with its range of allotted values. As processing element 1 ($730_1$) is only adapted to process jobs with an estimated processing time of less than 30 minutes, it will not select job A for processing, as job A requires 2 hours.

In one manner of implementation, the next processing element in the plurality of processing elements 730 in this case, processing element 2 ($730_2$), in turn inspects job A within the batch of jobs 720 and compares the estimated processing time with its range of allotted values. In this case, the estimated processing time of 2 hours is within the range of processing element 2 ($R_2<10:00$) and processing element 2 ($730_2$) selects job A for processing. Once a job has been selected for processing from the batch 720, then it is typically removed from the batch or marked as "in processing" and the process of job selection and assignment begins again. For example, on inspection of job B, the first processing element ($730_1$) will find that the estimated processing time of job B lies within its range of allotted values ($R_1<00:30$) and thus will select and process job B. Job B can then be removed from the batch 710 or marked as "in processing". If both processing element 1 and processing element 2 have removed jobs A and B for processing, and thus are both marked as busy, processing element N ($730_N$) will inspect job C and will find that its estimated processing time of 12 hours is within its allotted range of values ($R_N<\infty$). It can then remove this job from the queue for processing. Once each processing element has finished processing an assigned job, the jobs may then be added to a batch of processed jobs 740.

In an alternative method of implementation, a free processing element may circle through each job in the batch of waiting jobs 710 until it finds a waiting job with an estimated processing time within its range of allotted values. For example, when processing element 1 ($730_1$) becomes free it may start by inspecting job A. When it finds that the estimated processing time of job A is outside of its range, it may move to the next job in the queue structure 720, job B, and inspect the estimated processing time for such a job. If such an estimated processing time does fall within the range then the processing element will stop its movement through the batch of waiting jobs shown in 710 and begin processing the assigned job.

The processing time for a job may be estimated in a number of ways. For example, in a particular implementation the estimate processing time may be based on categorizing jobs within the batch of waiting jobs 710, wherein each category that can be assigned to the jobs has an associated processing time estimate. Such an estimate may be pre-calculated using existing knowledge of processing times. In other embodiments the processing time may be estimated using the size of the job, wherein each processing element 730 has an associated range of job sizes that it can process. In this case, a job may be assigned based on the comparison of the job size with the size range for each processing element. This may be the case wherein each job comprises a quantum of data and so each processing element may have a range of file sizes it is allotted to process.

A second embodiment of the present invention will now be described with relation to FIGS. 1 to 6, illustrating the use of a batch processing system such as that shown in FIG. 7 in a text translation system, wherein the jobs comprise processing procedures involved in the translation of text information associated with a software application. The text translation system described herein thus provides a preferred application of the system and method of the present invention.

With the rise of international trade and the growth of worldwide communication networks an application developer is now able to distribute a software application globally to a number of different countries. As each country typically has different linguistic requirements, this then produces a requirement for text information associated with the software application to be translated from a first native language of production to one or more second languages. This text information may comprise embedded help, online help, user and/or technical names, and/or implementation documentation.

When translating text information associated with a software application, there is often the problem of adequately controlling the translation process. Notwithstanding developments in machine intelligence, the translation process still remains a human art that requires a team of skilled bilingual translators. Typically, the translators for a particular language will be located in the native country or region of said language and this will in most cases be geographically remote from the country where the original text information is generated. In most cases, each translator is given a number of blocks of text information to translate in a piecemeal fashion as the information is written in the native language of production. The translation time for each block of text information is often highly variable, being based on the workload of the translator and the complexity of the text.

Hence, there is a requirement for systems and methods that can process a large number of heterogeneous data files that are intermittently received from a large number of geographical diverse operators. Furthermore, there is a requirement for systems and methods that can operate across different time zones and working patterns.

For a large application producer there is also the problem of scheduling the translation process in order to accommodate a large number of different translation transactions that all require common processing or resources. The process of translation will often require verification and validation routines as the text information is sent from and to the translators. This problem may become particularly acute during the development and launch of a major product, wherein there will be strict deadlines to comply with. Hence, the processing of translated data presents a parallel batch processing problem as discussed previously in the specification.

Figure 1:
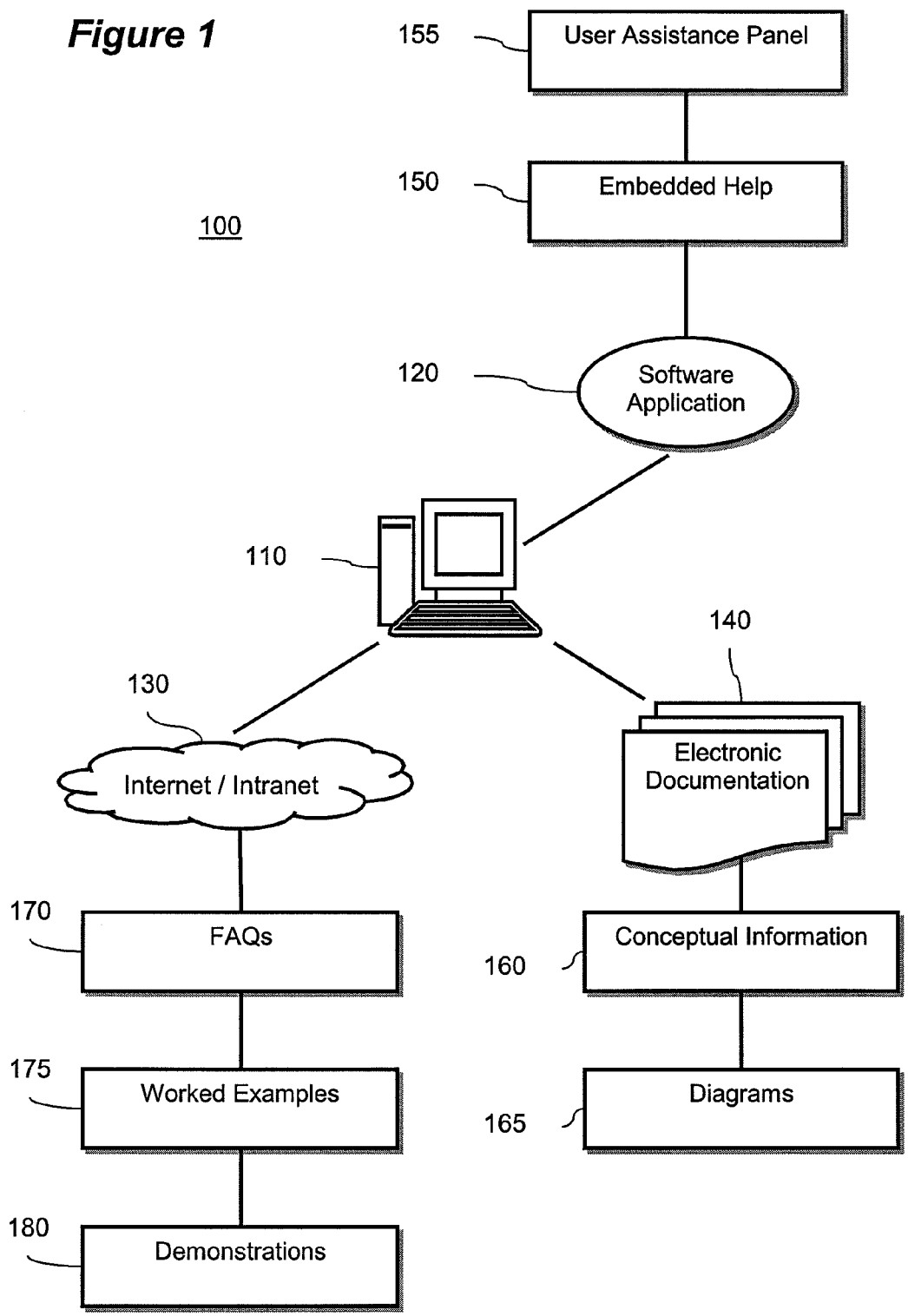
FIG. 1 shows possible text information that may be associated with a software application relating to a second embodiment of the present invention.

FIG. 1 illustrates the components of a body of text 100 associated with a software application. Software application 120 typically comprises program code that, in use, is stored in a memory of a computer system 110. This program code is then executed at appropriate times by a processor associated with the computer system 110. The software application 120 may be any software application known in the art.

Typically during development of software application 120, text components 150 to 180 are generated. Components 150 and 155 are directly incorporated into software application 120 while components 160 and 165 may be supplied as separate electronic documentation 140 and elements 170 to 180 may be provided over a network 130 such as the Internet.

The text information may be in the form of: standard ASCI (American Standard Code for Information Interchange) text; extended mark-up language (XML) files; embedded text within figures, tables, graphics, multimedia presentations; or any other text that appears in the application whether as labels or fields on the interface, embedded help, or supplementary help topics accessible by hyperlink.

Figure 2:
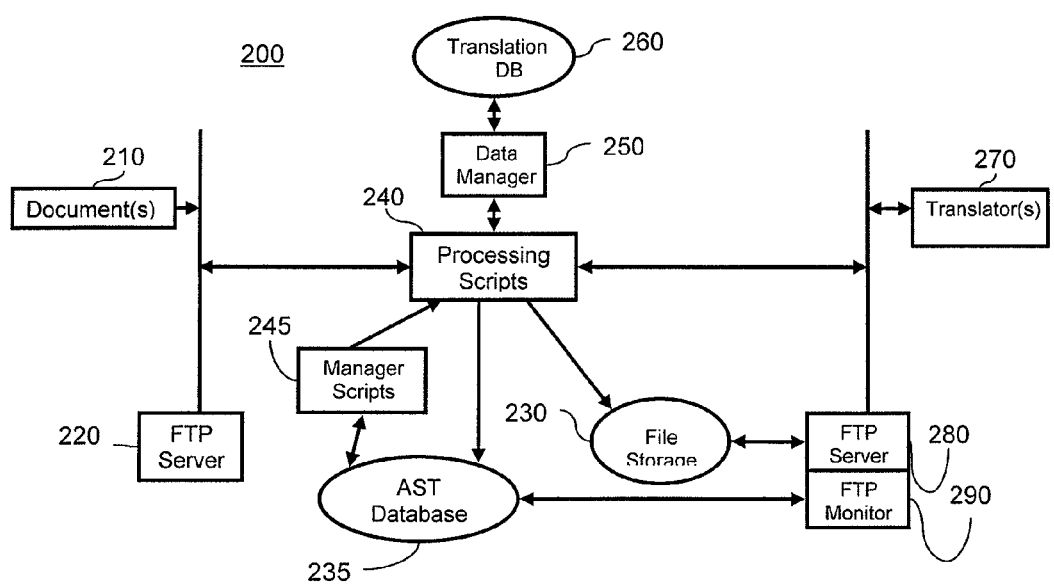
FIG. 2 illustrates schematically a translation system that may incorporate a second embodiment of the batch system of the present invention.

FIG. 2 shows a translation system 200 for translating documents 210 such as text components 150 to 180 shown in FIG. 1. The translation system 200 comprises a centralized system that is able to receive one or more original documents 210 in a first language from developers. The system 200 is also adapted to receive one or more translations of the documents in one or more second languages from one or more translators 270. Such a system is able to receive data and documents from client computers spread across a wide variety of geographical locations.

The core of the translation system 200 consists of processing scripts 240. Processing scripts 240 comprise one or more lines of program code that are configured to manage processing of data in response to particular events within the system 200. The processing scripts 240 interact with file storage 230, automated status tracking (AST) database 235, manager scripts 245 and data manager 250. The translation system further comprises a first FTP server 220 for uploading documents 210 to the system and a second FTP server 280 for downloading and uploading data to one or more translators 270. An FTP monitor 290 is further provided to monitor the data transfer events taking place using the FTP server 280 and accordingly update the status of documents and their component data on AST database 235. FTP monitor 290 may comprise one or more scripts that comprise computer program code to be processed on FTP server 280 or a separate entity.

File storage 230 may be implemented using convention storage devices known in the art (e.g. hard disk drives or Redundant Arrays of Inexpensive/Independent Disks (RAID)) and is used to store files received from the one or more translators 270. The AST database 235 keeps a record of the status of documents 210 and their various component data through one or more processes of the translation system 200. Typically, the AST database 235 will not store the documents 210 themselves. Manager scripts 245 comprise one or more lines of program code that are configured to interrogate the AST database 235 and invoke or implement the appropriate processing scripts 240 based on status data retrieved from the AST database 235. Data manager 250 in turn controls access to translation database (DB) 260.

Original documents in a first language 210 are uploaded to the first FTP server 220 which is then accessed by the processing scripts 240. The processing scripts 240 then manage the documents 210. During management of the documents 210 and their component data, processing scripts 240 may communicate with AST database 235 to update their current status. The management of documents 210 may optionally involve temporarily transferring the appropriate data to file storage 230 before such data is supplied to the one or more translators 270 using the second FTP server 280. Alternatively the processing scripts 240 may provide the appropriate data directly to the one or more translators using the second FTP server 280. In either case, the translators 270 receive appropriate data via the second FTP server 280 which is operably monitored by FTP monitor 290. In certain embodiments the first and second FTP servers may be implemented on a single hardware device. The translators 270 use the second FTP server 280 to download text information in the form of processed data. The FTP monitor 290 monitors, and in certain embodiments, manages procedures related to the download and upload of such data.

Figure 3:
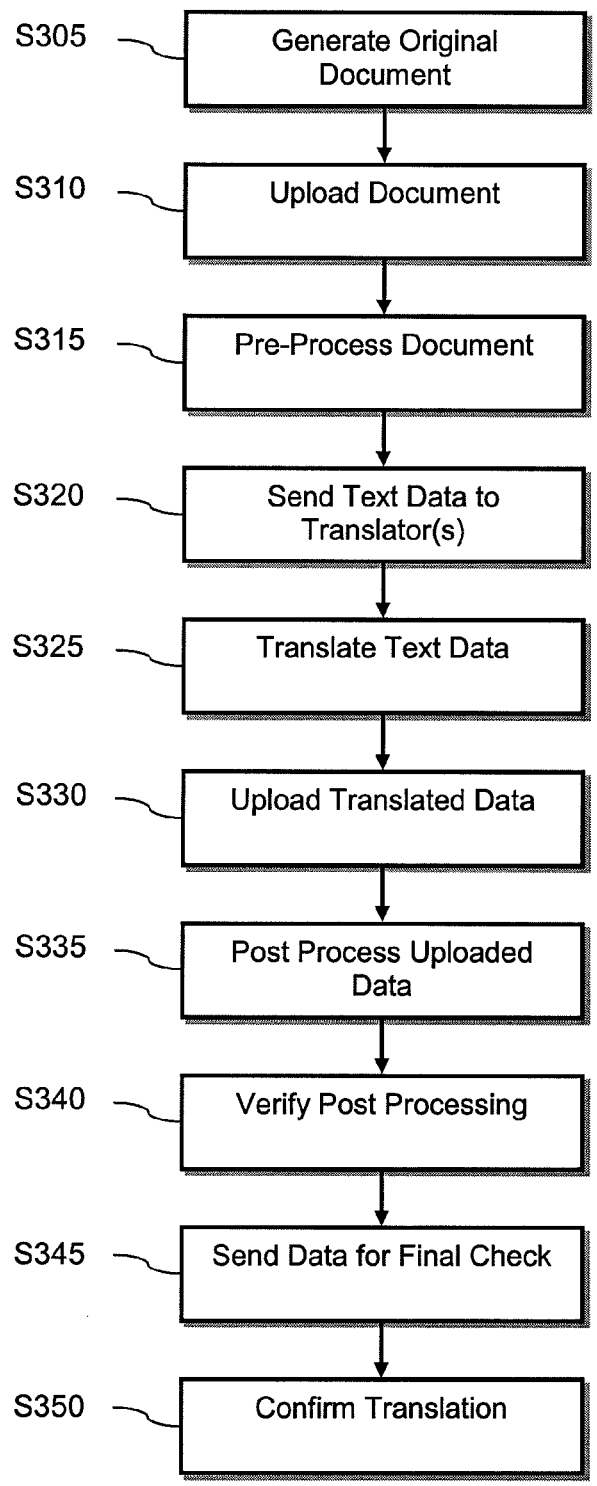
FIG. 3 shows a processing method of translating text that may incorporate the method of the second embodiment.

The operation of the system 200 shown in FIG. 2 will now be further described in relation to the translation method of FIG. 3. At step S305 an original document 210 is generated in a first language at a first location. At step S310 this document is uploaded to FTP server 220. Once uploaded, one or more processing script 240 are initiated on a server device to perform a number of pre-processing steps as shown in step S315. These pre-processing steps may comprise splitting the document 210 into one or more different text segments. Each segment may comprise a line, paragraph or larger section of text that needs to be translated. In order to avoid translating previously translated segments and to increase the reuse of existing translations, the one or more processing scripts 240 call functions provided by data manager 250. These functions determine whether a translation into a selected second language of a particular text segment of a first language already exists in translation database 260. If a translation does exist then the matching segment of the original document 210 need not be translated; however, if there is no matching translation for the segment within the translation database 260 then the data manager 250 returns this information to the one or more processing scripts 240. This matching process is typically performed for all segments of a document. Based on the information returned from data manager 250, one or more processing scripts 240 prepare and package the untranslated text segments into a form ready for sending to one or more translators 270.

If one or more segments need to be translated then at step S320 one or more processing scripts 240 send the appropriate segments to translators 270. This step may comprise uploading a compressed or "zip" file containing the text segments to be translated to the second FTP server 280 or file storage 230. In certain embodiments a different file is provided for each "build" or version of the one or more original documents 210. The compressed files may also be differentiated for each translation language. After uploading the required file or files to the second FTP server 280, the appropriate translators 270 are able to access the data comprising the untranslated text segments. In certain embodiments each compressed file may contain text segments from a plurality of different documents that all require translation into the same second language. The translators 270 then use the second FTP server 280 to retrieve the compressed file in order to appropriately translate the untranslated text segments. The translation of the untranslated segments is performed at step S325.

After the translators 270 have translated the untranslated text segments into their required second language then the translated text segments are again combined into a compressed or "zip" file by the translators 270 and the compressed file is uploaded to FTP server 280 at step S330. In other embodiments the uploaded data may be in a form other than the compressed file, for example the translated text may be directly entered into a HTML page. The uploaded data is then typically stored on file storage 230 and the AST database 235 is updated by FTP monitor 290 to signify the receipt of the data. After uploading the translated data at step S330 an appropriate processing script or scripts 240 are initiated to post process the data at step S335. The processing scripts 240 may be initiated by manager scripts 245 that monitor for the appropriate change in the status of the data with AST database 235, i.e. monitor for a change in the status record associated with the data in question.

The post processing step is described in more detail later with reference to FIG. 6. In summary, step S335 comprises uncompressing any text segments from the compressed file stored in the file storage 230 and then loading the appropriately translated segments into the translation database 260 using data manager 250. If the segments have not been translated properly then errors are flagged at this stage. Typically, the post processing is verified at S340 by taking the original document 210 in the original first language and resegmenting said document into a number of text segments in the first language. The resegmented elements of the document 210 (the second set of text segments in the first language) are then checked to see whether matching translated segments exist in translation database 260. If the segments of the document have been successfully translated then all the resegmented elements should find matching translated segments.

At step S345 a translated document is generated by combining the matching translated segments that were retrieved from the translation database 260 in step S340 using data manager 250. This then produces a final translated version of the original document, i.e. a version of document 210 in a second language. In some embodiments, this translated document may be forwarded to the translators 270 for a final check at Step S345. In this case, one or more processing scripts 240 prepare the translated document for download to the one or more translators 270 via the second FTP server 280. The translators 270 are then able to download the translated document for final approval using FTP server 280 and this transaction may be monitored by FTP monitor 290, which in turn may update AST database 235. At step S350 the translators 270 either confirm the translation, which completes the translation process, or amend the translated document to correct any errors.

Figure 4:
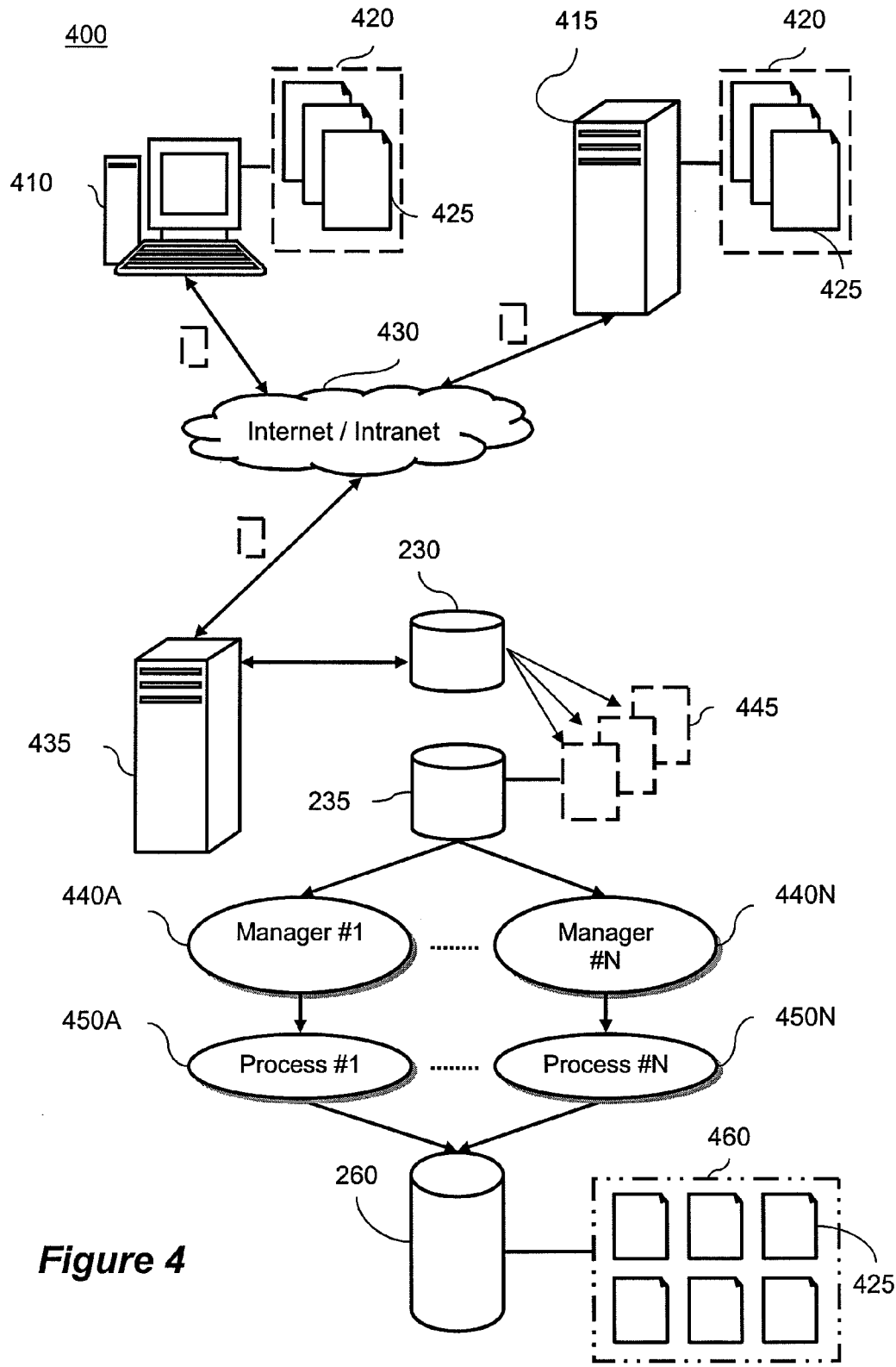
FIG. 4 shows a batch processing system according to the second embodiment of the present invention that may be implemented as part of the translation system.

FIG. 4 shows an embodiment of the present invention that may be used to implement steps S330 to S340. FIG. 4 shows a client device 410, which may be a device used by one or more translators 270 and a number of text segments 425 that are contained within a compressed file 420. Typically, the operator of the client device 410 downloads a version of file 420 containing untranslated text segments 425, uncompresses and translates the segments 425, before reconstructing the compressed file 420 and replacing the untranslated segments with their translated counterparts. After translation and the reconstruction of file 420, the operator of client device 410 transfers the file 420 over a network 430, such as the Internet or an intranet, to central server 435. Central server 435 may comprise a computer system suitably adapted to initiate and run the processing scripts 240.

In certain embodiments, the central server 435 may also comprise FTP servers 220 and 280. In other embodiments the FTP servers 220 and 280 may be implemented by one or more separate computer systems such as server 415, which is also connected to the network 430. When using FTP servers remote from central server 435 the operator of client device 410 may transfer file 420 to server 415. The file then resides on this server 415 until central server 435 is ready to download the file from server 415 over the network 430. In alternative embodiments, servers 435 and 415 may be directly connected over a local area network (LAN) itself connected to a larger wide area network (LAN).

Central server 435 is connected to file storage 230 and is adapted to receive a plurality of compressed files 420 from either client device 410 or server 415 and store said files 420 within the storage 230. Once the files are received they are stored as a batch 445 in the file storage 230. Typically, FTP monitor 290, in the form of computer code processed by a processor of server 435 or server 415, is adapted to update a status record in the AST database 235 to indicate that files 420 have been received and/or stored within batch 445 on the file storage 230.

Typically, the batch 445 of files will be organised in a queue structure. Such a queue structure can be implemented in several ways. In a preferred embodiment, the queue structure is implemented using AST database 235. AST database 235 comprises status records associated with the received files 420 which in turn may comprise attribute fields with data corresponding to the properties of the received file 420 and its current status in the translation process. These attribute fields are typically updated by various processes within the translation system 200, including any of FTP monitor 290 or manager scripts 245. The status records and associated attribute fields may then be used to implement the queue. In certain embodiments the queue may comprise a sorted subset of records within the AST database 235 that have a common attribute field, wherein each record is associated with a file to be processed and the subset covers the batch 445.

The attribute fields may comprise one or more of: the project or application name associated with the text in the file, the version of the file or the text segments 425 within the file, details of text segments 425 contained within the file, details of the upload or download of the file at steps S310 or S330 (e.g. times, dates, IP addresses etc), the second language that the segments have been translated into, the size of the file, a priority field, the present status of the file, the date the file was created, an override field, or details related to the past or future processing of the file. The priority field may comprise a value wherein a file with the smallest priority number will get the highest priority and a file with a priority value of "null" will get the lowest priority. The priority value may be assigned by a project manager or manager scripts 245.

To implement the queue structure, the manager scripts 245 may sort appropriate file records relating to batch 445 based on the priority value. In certain embodiments, if multiple files within the batch 445 have the same priority value, then the file with an earlier created timestamp will be prioritised over the file with a later timestamp. The timestamp may correspond to the time the file was received or the time the file was created. The status value of each file record in the queue will typically have one of two status values: "waiting", which represents that the file has been received and is waiting for processing; or "processing", wherein the file has been selected and is now being processed.

FIG. 4 shows a plurality of processing elements 450A to 450N. These processing elements 450A to 450N are adapted to process data in a similar manner to processing elements $P_1$ to $P_N$ described in relation to the first embodiment. Each processing element may comprise one or more processing scripts 240, such as those illustrated in FIG. 2. Each processing element also has an associated manager script 440. Manager scripts 440A to 440N may form part of the group of manager scripts 245 shown in FIG. 2.

To perform the processing of the files 445, two or more processing elements 450 are used. Each processing element 450 is adapted to process files from the file storage 230 and to perform a series of post processing steps on said file in order to load translated text segments 425 into translation database 260. Each processing element 450 is initiated by its corresponding manager script 440. The group of manager scripts 440 poll the data with the AST database 235 and invoke the appropriate processing element 450. The processing elements 450 may form part of the group of processing scripts 240. Once a file has been successfully processed, it may optionally be removed from the file storage 230.

Each processing element 450A to 450N has an associated range of file sizes that it is adapted to process. For example, in a sample system with N=2, a first processing element 450A may be configured to process any file within the batch 445 stored in file storage 230 (i.e. $0 \leq R_1 < \infty$ megabytes or MB), whereas a second processing element 450B may be configured to only process files 445 with a file size below a predetermined value (a "process threshold"—T—i.e. $0 \leq R < T$ MB).

An example of the use of processing elements according to the present invention will now be described with reference to the method of FIG. 5. At step S510 the central server 435 downloads one or more files for post-processing. At step S520 the FTP monitor 290 updates records stored in AST database 235 that implements the queue structure. This process "adds" the downloaded file to the queue structure. The FTP monitor 290 may also update status attribute fields within the records, setting the current status to "waiting", representing the fact that the files have yet to be processed. Alternatively, the current status may be set to "waiting" by manager scripts 245, 440 after detecting any update performed by FTP monitor 290. A combination of one or more of the FTP monitor 290 and manager scripts 245, 440 may be seen to be a "job manager" that supervises the processing of the files.

At step S530 each manager script 440 that is associated with an idle processing element 450, i.e. a processing element 450 that is not currently processing a file, retrieves a first file in the queue with a status of "waiting". If the files are ordered according to priority said first file may be a file with the highest priority (i.e. a file with the smallest priority number). This "selection" may comprise querying the file records associated with the batch 445 to retrieve a "first" sorted record and a link to the associated file in file storage 230.

At step S540 each active manager script 440 compares the file size of the file selected in step S530 (i.e. the quantity of data making up the quantum of data) with the process threshold of its associated processing element. If the file size of the present file is below the process threshold then the manager script 440 will initiate its associated processing element 450, which will then process the file at step S560. While processing the file the status of the file is set to "processing" preventing it from being selected again for processing. This setting of the file status may be performed by the manager script 440 or by the processing element 450. If the file size is greater than the process threshold at step S540 then the next available file is selected from the queue at step S550. Step S540 is then repeated, wherein the file size of the file selected in step S530 is compared with the process threshold of the processing element. The cycle of steps S540 and step S550 continues until the file size is below a process threshold or until a file is selected by a processing element that does not have a process threshold.

After the file has been processed at step S560 the file is removed from the queue structure at S570 and then a check is made to see whether there are more files in the queue structure at step S580. Again, these steps are typically performed by manager scripts 440. If there are more files in the queue structure then the next file in the queue structure is selected at S530 and the process begins again. If there are not more files in the queue then the process ends.

The processing performed at S560 will now be described with reference to FIG. 6. In certain alternative embodiments, the processing element may check the content of the selected file in order to check that all the text segments 425 within the file have been correctly downloaded. However, in the present example, the method starts at step S610, wherein the text segments 425 contained within the file are "merged", which means that data manager 250 loads the translated segment into translation database 260 and assigns the appropriate language and version attributes. Step S610 is performed for all text segments 425 within a selected file. At step S620 the "merge" process is verified by performing a "leverage" process; this process involves taking the original document 210 in a first language and re-segmenting the document i.e. again breaking the document into a number of segments as was performed in the pre-processing at step S315. The re-segmented elements of the original document are then used to check whether a match in the chosen language exists within the translation database 260 i.e. whether a translated segment in a chosen second language exists corresponding to the re-segmented element. If the "merge" process in S610 has been successful then a translated version 460 of the original document 210 can then be created by retrieving the matching translated segments of the original document from the translation database 260.

Figure 5:
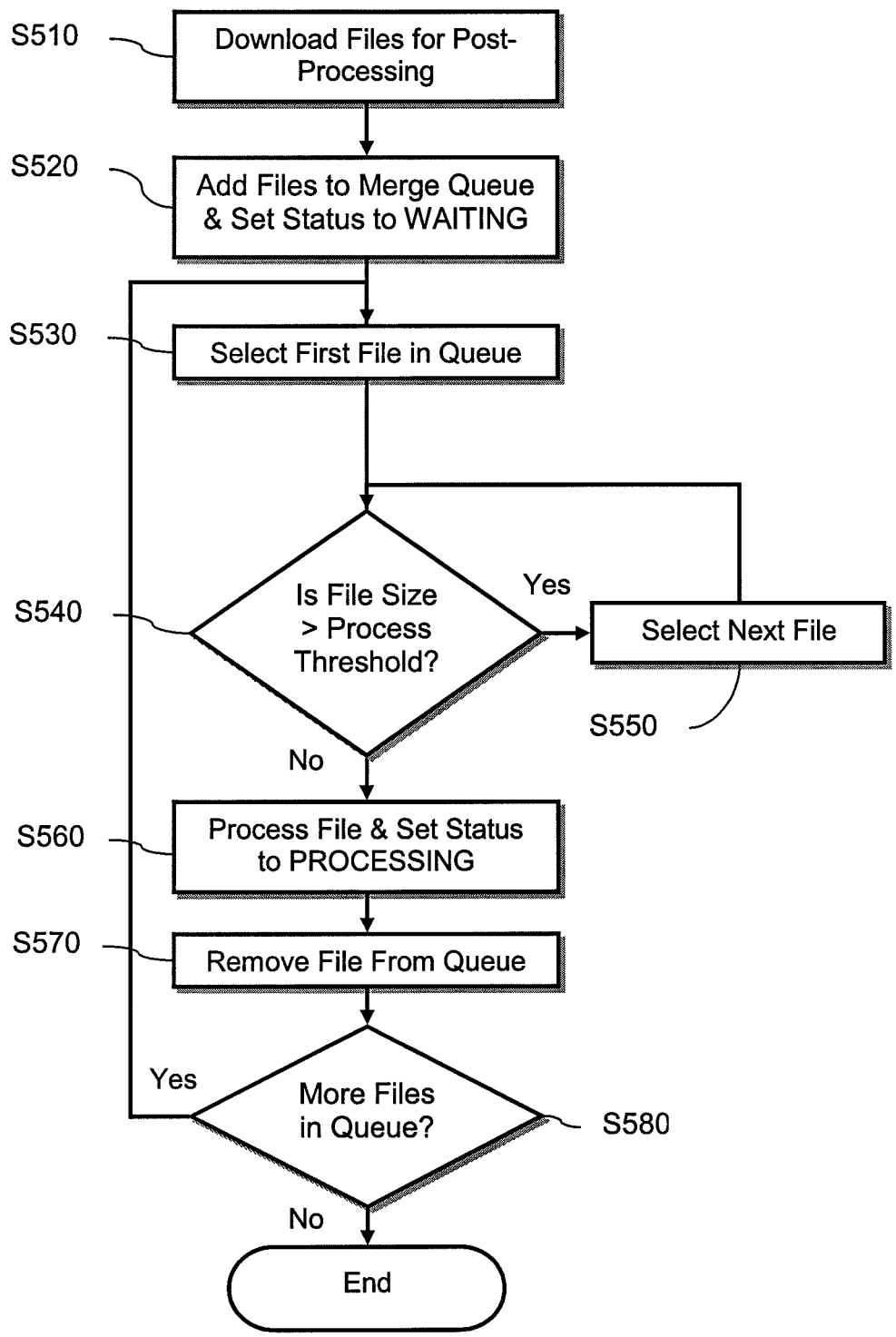
FIG. 5 illustrates a method of batch processing data according to the second embodiment of the present invention.
Figure 6:
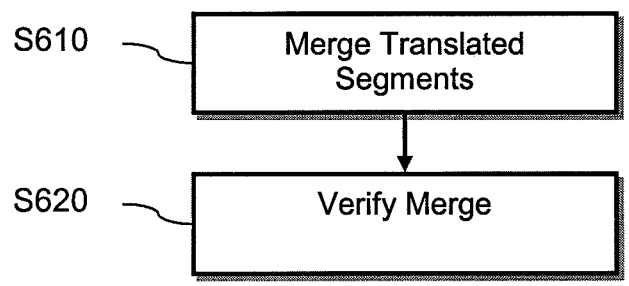
FIG. 6 illustrates a method of processing translated data that may be used in association with the second embodiment of the present invention.

The processing scripts 240, 440, manager scripts 245, 450 and FTP monitor 290 that interact to perform the methods of FIGS. 3, 5 and 6 may be provided as scripts in the PERL programming language and may be implemented by an appropriate interpreter on central server 435. The process thresholds for the processing elements 450 may be set using an extended mark-up language (XML) control file that is interrogated by a PERL processing script.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

What is claimed is:

1. A method comprising:
for each particular job within a batch comprising a plurality of jobs, performing, by a computer system:
(a) determining an estimated processing time for the particular job, and
(b) determining whether the estimated processing time is not greater than a first maximum time value associated with a first processing element in a plurality of processing elements, each of which is associated with a separate unchanging maximum time value that differs from a maximum time value of each other processing element in the plurality of processing elements;
if the computer system determines that estimated processing times for all jobs in the batch are greater than the first maximum time value, causing the first processing element to not process any jobs at least until a new job is added to the batch;
if the computer system determines that an estimated processing time for a first job in the batch is greater than the first maximum time value, determining, by the computer system, whether the estimated processing time for the first job is not greater than one or more other maximum time values associated with one or more other processing elements in the plurality of processing elements; and
if the computer system determines that the estimated processing time for the first job is greater than each of the one or more maximum time values associated with the one or more other processing elements, processing, by the computer system, the job with a second processing element that is associated with a maximum time value of infinity.

2. The method of claim 1 further comprising:
receiving, by the computer system, a first job and adding the first job to the batch;
upon adding the first job to the batch, setting, by the computer system, a status of the first job to a first value indicating that the first job can be selected;
upon assigning the first job to the first processing element, setting the status of the first job to a second value indicating that the first job can no longer be selected; and
upon completing processing of the first job using the first processing element, removing, by the computer system, the first job from the batch;
wherein adding the first job to the batch comprises adding the first job to a queue structure configured to sequentially order the jobs in the batch prior to subsequent processing.

3. The method of claim 2 wherein the first job is received from a device remote from the computer system via File Transfer Protocol (FTP).

4. The method of claim 2 wherein each job in the batch is associated with a priority.

5. The method of claim 1 wherein the estimated processing time is determined based on a size of data included in the particular job; and wherein the data includes one or more segments of text that have been translated from a first language to a second language.

6. A non-transitory computer readable medium having stored thereon instructions executable by a processor, the instructions comprising:
instructions that cause the processor to perform, for each particular job within a batch comprising a plurality of jobs:
(a) determining an estimated processing time for the particular job, and
(b) determining whether the estimated processing time is not greater than a first maximum time value associated with a first processing element in a plurality of processing elements, each of which is associated with a separate unchanging maximum time value that differs from a maximum time value of each other processing element in the plurality of processing elements;
instructions that cause the processor to cause the first processing element to not process any jobs at least until a new job is added to the batch if the processor determines that estimated processing times for all jobs in the batch are greater than the first maximum time value;
instructions that cause the processor to determine whether the estimated processing time for the first job is not greater than one or more other maximum time values associated with one or more other processing elements in the plurality of processing elements if the processor determines that an estimated processing time for a first job in the batch is greater than the first maximum time value; and
instructions that cause the processor to process the job with a second processing element that is associated with a maximum time value of infinity if the processor determines that the estimated processing time for the first job is greater than each of the one or more maximum time values associated with the one or more other processing elements.

7. A system comprising:
a storage device configured to store a batch including a plurality of jobs; and
a processor in communication with the storage device, the processor being configured to:
for each particular job within the batch, determine an estimated processing time for the particular job, and determine whether the estimated processing time is not greater than a first maximum time value associated with a first processing element in a plurality of processing elements, each of which is associated with a separate unchanging maximum time value that differs from a maximum time value of each other processing element in the plurality of processing elements;
cause the first processing element to not process any jobs at least until a new job is added to the batch if estimated processing times for all jobs in the batch are greater than the first maximum time value;
determine whether the estimated processing time for the first job is not greater than one or more other maximum time values associated with one or more other processing elements in the plurality of processing elements if an estimated processing time for a first job in the batch is greater than the first maximum time value; and
cause the job to be processed with a second processing element that is associated with a maximum time value of infinity if the estimated processing time for the first job is greater than each of the one or more maximum time values associated with the one or more other processing elements.

* * * * *